(12) United States Patent
Ishiyama et al.

(10) Patent No.: US 7,779,107 B2
(45) Date of Patent: *Aug. 17, 2010

(54) PREFIX AND IP ADDRESS MANAGEMENT SCHEME FOR ROUTER AND HOST IN NETWORK SYSTEM

(75) Inventors: Masahiro Ishiyama, Kanagawa (JP); Tatuya Jinmei, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 298 days.

This patent is subject to a terminal disclaimer.

(21) Appl. No.: 11/744,025

(22) Filed: May 3, 2007

(65) Prior Publication Data
US 2007/0201479 A1 Aug. 30, 2007

Related U.S. Application Data

(62) Division of application No. 10/323,992, filed on Dec. 20, 2002, now Pat. No. 7,308,495.

(30) Foreign Application Priority Data
Dec. 21, 2001 (JP) ............................. 2001-390468

(51) Int. Cl.
*G06F 15/173* (2006.01)
*G06F 15/16* (2006.01)
(52) U.S. Cl. ....................... 709/223; 709/224; 709/226; 709/245
(58) Field of Classification Search ......... 709/223–224, 709/226, 245
See application file for complete search history.

(56) References Cited

U.S. PATENT DOCUMENTS

| | | | |
|---|---|---|---|
| 6,804,720 B1 * | 10/2004 | Vilander et al. | 709/229 |
| 6,865,611 B1 | 3/2005 | Bragg | |
| 6,928,485 B1 * | 8/2005 | Krishnamurthy et al. | 709/242 |
| 7,031,320 B2 | 4/2006 | Choe | |
| 7,046,786 B2 * | 5/2006 | Liesenberg | 379/221.14 |
| 7,219,160 B1 * | 5/2007 | Buchsbaum et al. | 709/242 |

OTHER PUBLICATIONS

T. Narten, et al. "Request for Comments: 2461; Neighbor Discovery for IP Version 6 (IPv6)"; Dec. 1998, pp. 1-47.
S. Thomson, et al. "Request for Comments: 2462; IPv6 Stateless Address Autoconfiguration"; Dec. 1998, pp. 1-13.
T. Narten, et al."Request for Comments: 3041; Privacy Extensions for Stateless Address Autoconfiguration in IPv6"; Jan. 2001, 10 pages.

* cited by examiner

*Primary Examiner*—Hussein A. Elchanti
(74) *Attorney, Agent, or Firm*—Oblon, Spivak, McClelland, Maier & Neustadt, L.L.P.

(57) ABSTRACT

In a network system formed by one or a plurality of hosts having a function for accessing Internet, and a router for connecting each host and the Internet through an accessing communication path of a provider, two types of IP address including first type IP addresses and second type IP addresses are generated and selectively used by each host, according to two types of prefix including first type prefixes and second type prefixes that have shorter valid periods than the first type prefixes, which are advertised from the router periodically.

4 Claims, 8 Drawing Sheets

| FIXED ADDRESS PREFIX | VALID PERIOD |
|---|---|
|  |  |
|  |  |

| PRIVACY PROTECTION PREFIX | VALID PERIOD |
|---|---|
|  |  |
|  |  |

| FLAG | PREFIX | VALID PERIOD |
|---|---|---|
|  |  |  |
|  |  |  |
|  |  |  |
|  |  |  |

FIG.7A

| FIXED ADDRESS | VALID PERIOD |
|---|---|
|  |  |
|  |  |

FIG.7B

| PRIVACY PROTECTION ADDRESS | VALID PERIOD |
|---|---|
|  |  |
|  |  |

FIG.8

| FLAG | ADDRESS | VALID PERIOD |
|---|---|---|
|  |  |  |
|  |  |  |
|  |  |  |
|  |  |  |

PREFIX AND IP ADDRESS MANAGEMENT SCHEME FOR ROUTER AND HOST IN NETWORK SYSTEM

CROSS-REFERENCE TO RELATED APPLICATIONS

The present application is a divisional of co-pending U.S. application Ser. No. 10/323,992, filed Dec. 20, 2002, which claims priority to Japanese Patent Application No. JP 2001-390468, filed Dec. 21, 2001, the entire contents of each of which are hereby incorporated herein by reference in their entirety.

BACKGROUND OF THE INVENTION

1. Field of the Invention

The present invention relates to a network system for connecting to the Internet by utilizing an Internet service provider, a router to be used in the network system, a host to be used in the network system, a prefix management method for the router, and an IP address management method for the host.

2. Description of the Related Art

In recent years, the utilization of the world largest computer network "Internet" has been spreading, and new computer businesses have been developed by accessing the Internet and utilizing disclosed information or services, or by providing information or services to external users who make accesses through the Internet. Also, new technological developments regarding the Internet utilization have been in progress.

On the Internet, each computer has an identifier called IP address, and the packet exchanges are carried out according to this IP address.

In IPv6, a mechanism called Address Auto Configuration is provided such that each device can autonomously set up the IP address without any human manual operation. In this mechanism, basically, a router notifies a prefix of an address managed for each interface of that router to a link by the multicast or broadcast, and each node listens to this and concatenate an interface address of that node.

Now, when a computer and the other devices of each home are constantly connected to the Internet, an IP address (global address) will be allocated fixedly to a computer or the like of each home. Then, this IP address is most likely (in principle) changed only in units of a very long period of time, such as a period until the connection target provider of the home is changed, for example, if it is ever changed. Also, the IP address is an indicator of a location on the network, so that it is preferable to have this location indicator unchanged from a viewpoint of the service providing side.

For example, consider the case where the video data are stored in a video deck connected to a home network (A) of some home and it is desired to reproduce them on a video data reproduction device connected to a home network (B) of another home through the Internet. In this case, one possibility is to treat the video deck on the home network A side as a service providing side. In this case, at the home network B side, the video data reproduction device will be commanded to receive the video data from the video deck on the home network A side. In this regard, the video data reproduction device on the home network B side needs to learn the IP address of the video deck on the home network A side (in the case of using end-to-end communication). On the other hand, another possibility is to treat the video data reproduction device on the home network B side as the service providing side. In this case, the video deck on the home network A side will be commanded to transmit the video data to the video data reproduction device on the home network B side. In this regard, the video deck on the home network A side needs to learn the IP address of the video data reproduction device on the home network B side.

However, if the IP address of the correspondent is changed frequently, it would become necessary to have a special mechanism or a human manual operation in order for the service providing side to learn the IP address of the correspondent. The same problem also arises in the Internet telephone because the call originating side of the Internet telephone needs to learn the IP address of the call terminating side.

As such, it is preferable to utilize the same IP address for a sufficiently long period of time such that it can be regarded as not changing, and this is most likely be the case in practice.

However, when the same IP address is utilized for a long period of time, there is a drawback that the serious problem of the privacy violation can possibly occur. Of course, the communication content itself can be concealed by encrypting it. However, it is basically difficult to encrypt the IP address. For this reason, it is possible to ascertain the correspondents of one user or the web site browsing preference of one user, by eavesdropping communications on a communication path, taking statistics of the IP addresses obtained by the eavesdropping, and analyzing them. Such information regarding the existence of the communication itself or information regarding correspondents can be used for the serious privacy violation.

As a conventional mechanism for protection against the privacy violation due to the IP address leakage, Privacy Extensions for Stateless Address Autoconfiguration in IPv6 (RFC 3041) is available. In this mechanism, the identification of the same device by the IPv6 address is made difficult by periodically changing a portion corresponding to the interface ID in the IPv6 address.

However, under the environment in which each home is constantly connected to the Internet, this mechanism cannot resolve the problem. This is because in the environment such as the home, the identification of the sub-network is considered as most problematic, but this mechanism only makes the identification of the device belonging to one sub-network difficult, so that under the environment in which each home is constantly connected to the Internet, the identification of the sub-network is still possible.

As such, the conventional mechanism has been impossible to protect the privacy in units of the sub-networks. Thus, it has been impossible conventionally to prevent the privacy violation by acquiring the personal information according to the IP address obtained by eavesdropping communications.

BRIEF SUMMARY OF THE INVENTION

It is therefore an object of the present invention to provide a prefix and IP address management scheme for a router and a host in a network system which is capable of preventing the privacy violation that utilizes the IP address.

According to one aspect of the present invention there is provided a network system comprising one or a plurality of hosts having a function for accessing Internet, and a router for connecting each host and the Internet through an accessing communication path of a provider, wherein the router has: a management unit configured to manage one or a plurality of first type prefixes and their valid periods, and one or a plurality of second type prefixes that have shorter valid periods than the first type prefixes and their valid periods, which are allocated from the provider; a request unit configured to request allocation of one or a plurality of new second type prefixes to the provider, before all of the second type prefixes managed by the management unit become invalid; and an advertisement unit configured to advertise periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts; and each host has: a generation unit configured to generate one or a plurality of first type IP addresses and one or a plurality of second type IP addresses, respectively according to the first type prefixes and the second type prefixes advertised from the router in an identical link; a management unit configured to manage the first type IP addresses and the second type IP addresses generated by the generation unit, and valid periods of the first type IP addresses and the second type IP addresses that are determined according to latest information regarding the valid periods of the first type prefixes from which the first type IP addresses are generated and latest information regarding the valid periods of the second type prefixes from which the second type IP addresses are generated, which are advertised from the router; and a selection unit configured to select one IP address to be used as a source address of the each host from the first type IP addresses and the second type IP addresses that are still within their valid periods, at a start of communications by the each host.

According to another aspect of the present invention there is provided a router for connecting one or a plurality of hosts and Internet through an accessing communication path of a provider, the router comprising: a management unit configured to manage one or a plurality of first type prefixes and their valid periods, and one or a plurality of second type prefixes that have shorter valid periods than the first type prefixes and their valid periods, which are allocated from the provider; a request unit configured to request allocation of one or a plurality of new second type prefixes to the provider, before all of the second type prefixes managed by the management unit become invalid; and an advertisement unit configured to advertise periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts.

According to another aspect of the present invention there is provided a host for accessing Internet via a router for connecting each host and the Internet through an accessing communication path of a provider, the host comprising: a generation unit configured to generate one or a plurality of first type IP addresses and one or a plurality of second type IP addresses, respectively according to first type prefixes and second type prefixes that have shorter valid periods than the first type prefixes, which are advertised from the router in an identical link; a management unit configured to manage the first type IP addresses and the second type IP addresses generated by the generation unit, and valid periods of the first type IP addresses and the second type IP addresses that are determined according to latest information regarding valid periods of the first type prefixes from which the first type IP addresses are generated and latest information regarding valid periods of the second type prefixes from which the second type IP addresses are generated, which are advertised from the router; and a selection unit configured to select one IP address to be used as a source address of the each host from the first type IP addresses and the second type IP addresses that are still within their valid periods, at a start of communications by the host.

According to another aspect of the present invention there is provided a prefix management method at a router for connecting one or a plurality of hosts and Internet through an accessing communication path of a provider, the prefix management method comprising: managing one or a plurality of first type prefixes and their valid periods, and one or a plurality of second type prefixes that have shorter valid periods than the first type prefixes and their valid periods, which are allocated from the provider; requesting allocation of one or a plurality of new second type prefixes to the provider, before all of the second type prefixes managed by the managing step become invalid; and advertising periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts.

According to another aspect of the present invention there is provided an IP address management method at a host for accessing Internet via a router for connecting each host and the Internet through an accessing communication path of a provider, the IP address management method comprising: generating one or a plurality of first type IP addresses and one or a plurality of second type IP addresses, respectively according to first type prefixes and second type prefixes that have shorter valid periods than the first type prefixes, which are advertised from the router in an identical link; managing the first type IP addresses and the second type IP addresses generated by the generating step, and valid periods of the first type IP addresses and the second type IP addresses that are determined according to latest information regarding valid periods of the first type prefixes from which the first type IP addresses are generated and latest information regarding valid periods of the second type prefixes from which the second type IP addresses are generated, which are advertised from the router; and selecting one IP address to be used as a source address of the each host from the first type IP addresses and the second type IP addresses that are still within their valid periods, at a start of communications by the host.

According to another aspect of the present invention there is provided a computer program product for causing a computer to function as a router for connecting one or a plurality of hosts and Internet through an accessing communication path of a provider, the computer program product comprising: a first computer program code for causing the computer to manage one or a plurality of first type prefixes and their valid periods, and one or a plurality of second type prefixes that have shorter valid periods than the first type prefixes and their valid periods, which are allocated from the provider; a second computer program code for causing the computer to request allocation of one or a plurality of new second type prefixes to the provider, before all of the second type prefixes managed by the first computer program code become invalid; and a third computer program code for causing the computer to advertise periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts.

According to another aspect of the present invention there is provided a computer program product for causing a computer to function as a host for accessing Internet via a router for connecting each host and the Internet through an accessing communication path of a provider, the computer program product comprising: a first computer program code for causing the computer to generate one or a plurality of first type IP addresses and one or a plurality of second type IP addresses, respectively according to first type prefixes and second type prefixes that have shorter valid periods than the first type prefixes and their valid periods, which are advertised from the router in an identical link; a second computer program code for causing the computer to manage the first type IP addresses and the second type IP addresses generated by the first computer program code, and valid periods of the first type IP addresses and the second type IP addresses that are determined according to latest information regarding valid periods of the first type prefixes from which the first type IP addresses are generated and latest information regarding valid periods of the second type prefixes from which the second type IP addresses are generated, which are advertised from the router; and a third computer program code for causing the computer to select one IP address to be used as a source address of the each host from the first type IP addresses and the second type IP addresses that are still within their valid periods, at a start of communications by the host.

Other features and advantages of the present invention will become apparent from the following description taken in conjunction with the accompanying drawings.

BRIEF DESCRIPTION OF THE DRAWINGS

FIGS. 7A and 7B are diagrams showing one exemplary address management tables that can be used in the host of FIG. 6.

FIG. 8 is a diagram showing another exemplary address management tables that can be used in the host of FIG. 6.

DETAILED DESCRIPTION OF THE INVENTION

Referring now to FIG. 1 to FIG. 12, one embodiment of the prefix and IP address management scheme according to the present invention will be described in detail.

In the following, a home network provided in a home will be described as an example of a local area network for accessing the Internet through an accessing communication path provided by an Internet Service Provider (ISP).

Also, in the following, a device having a function for receiving a message such as a router advertisement (RA) message from a router in the same link and autonomously generating an IP address on a basis of a prefix (network prefix) contained in that message will be referred to as a "host". The host is typically a computer, but it is not limited to the computer and can be any device that has a function for accessing the Internet and a function for receiving or providing a prescribed service by accessing the Internet, such as home electronics device, AV device, and other information device (the device other than the computer such as home electronics device, AV device, and other information device may or may not be equipped with a CPU).

Also, in the following, it is assumed that a lifetime will be used as information regarding a valid period (or expiration time) to be added to the prefix advertised within the link. The host will obtain the ending time (year, month, day, hour, minute, second) of the valid period of that prefix by adding this lifetime to the receiving time of that message, for example (in which case the starting time of the valid period is set to be the receiving time of that message), or handles the lifetime as a remaining time until the valid period of that prefix expires.

Figure 1:
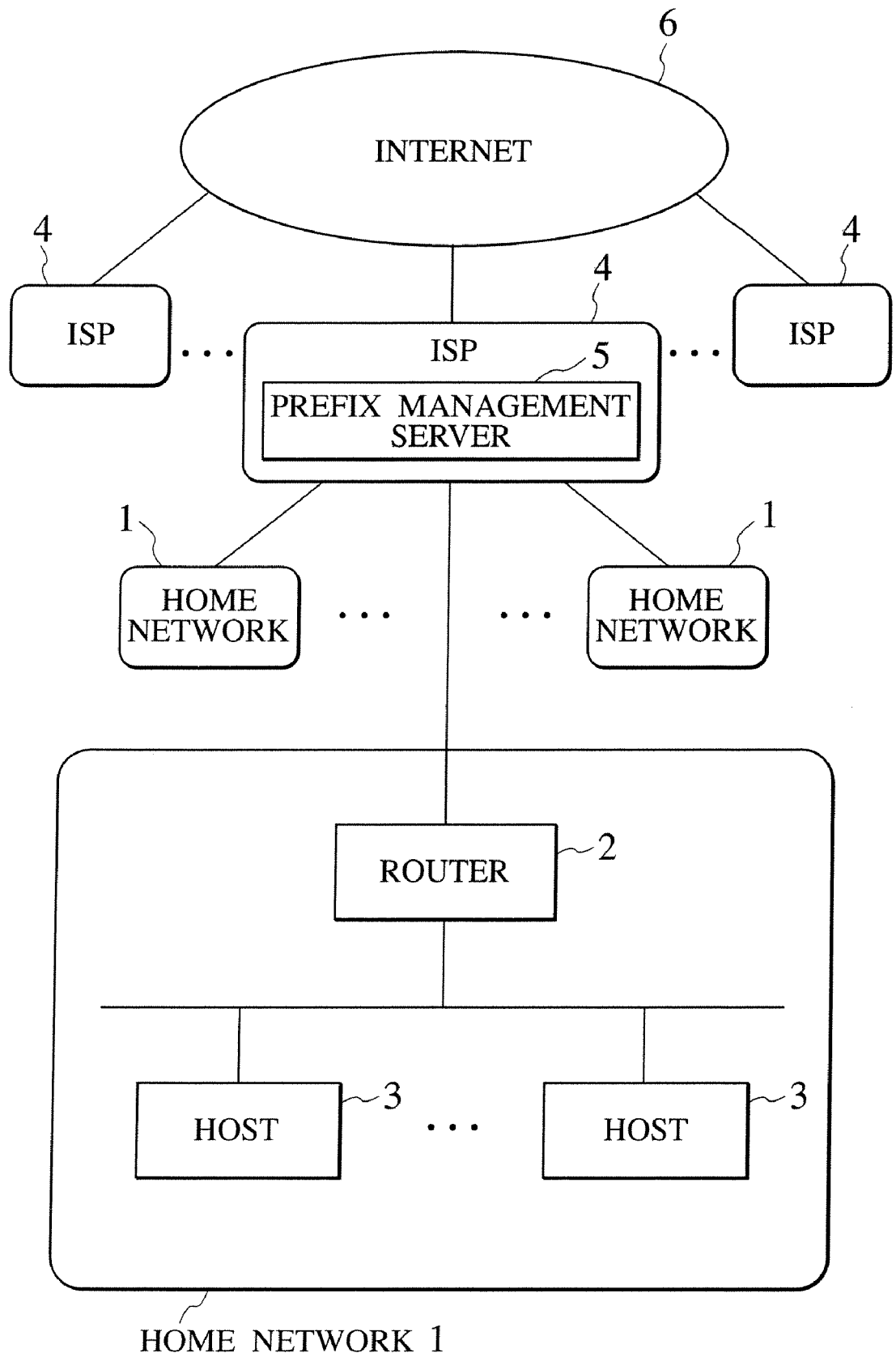
FIG. 1 is a block diagram showing an exemplary configuration of a network system according to one embodiment of the present invention.

FIG. 1 shows an exemplary configuration of a network system according to one embodiment of the present invention. The network system of FIG. 1 comprises home networks 1, a router 2, host 3, ISPs 4, a prefix management server 5 and the Internet 6.

In FIG. 1, the link on an inner side of the router 2 at a boundary portion between the ISP 4 and the home network 1 has two hosts connected, but it is also possible to have just one host connected, or three or more hosts connected (the number of hosts is arbitrary).

Note that each function of each host 3 can be realized by executing a program for that function at the CPU, or by a hardware such as a semiconductor device that implements that function. The same also applies to the router 2 and the prefix management server 5 as well.

Now, in this embodiment, as the IP address to be autonomously generated by the host 3 in the home network 1 (which is generated according to the prefix allocated to the router 2 of the home network 1 from the ISP 4 and advertised within the link from the router 2), the following two types of the IP address are used.

(1) IP address (global address) to be used fixedly over a long period of time (since the contract with the ISP is made until it is cancelled).

(2) IP address (global address) to be changed in a short period of time (which can be suitably determined according to the system as minute units, one hour units, one day units, one week units, one month units, session units, etc., for example) in order to prevent the privacy violation by the eavesdropping and the statistical analysis of the IP addresses.

The former will be referred to as a "fixed address" and the latter will be referred to as a "privacy protection address".

Also, the prefix from which the fixed address is generated will be referred to as a "fixed address prefix", and the prefix from which the privacy protection address is generated will be referred to as a "privacy protection prefix". Note that it suffices to describe this fixed address prefix in the DNS or the like.

Note that, in the network system of FIG. 1, an ISP that has no function for providing services regarding the privacy protection prefix may coexist (but those who contracted with this ISP that has no function for providing these services will not be able to receive these services in the home network even when that home network is connected to that ISP).

Also, in the network system of FIG. 1, (the router of) the home network connected to the ISP that has a function for providing services regarding the privacy protection prefix of this embodiment may be able to receive these services all the time, or may be able to select and set whether or not to receive these services. Also, whether or not to receive these services may be selected or set for each host.

The ISP that provides services regarding the privacy protection prefix of this embodiment and the router of the home network that receives these services will carry out management of both the "fixed address prefix" and the "privacy protection prefix", while the ISP that does not provide these services and the router of the home network that does not receive these services will carry out the management of only the "fixed address prefix".

The host 1 that receives services regarding the privacy protection prefix of this embodiment will utilize both the "fixed address" and the "privacy protection address", and the host that does not receive these services will utilize only the "fixed address".

In the following, the prefix management server 5 of the ISP for providing services regarding the privacy protection prefix, the router 2 of the home network 1 for receiving these services, and the host 3 for receiving these services will be described (the prefix management server of the ISP that does not provide these services and the router and the host of the home network that does not receive these services are the same as the conventional ones). Also, the fixed address prefix and the fixed address are basically the same as the conventional ones so that portions related to the privacy protection prefix and the privacy protection address will be mainly described in the following.

Figure 2:
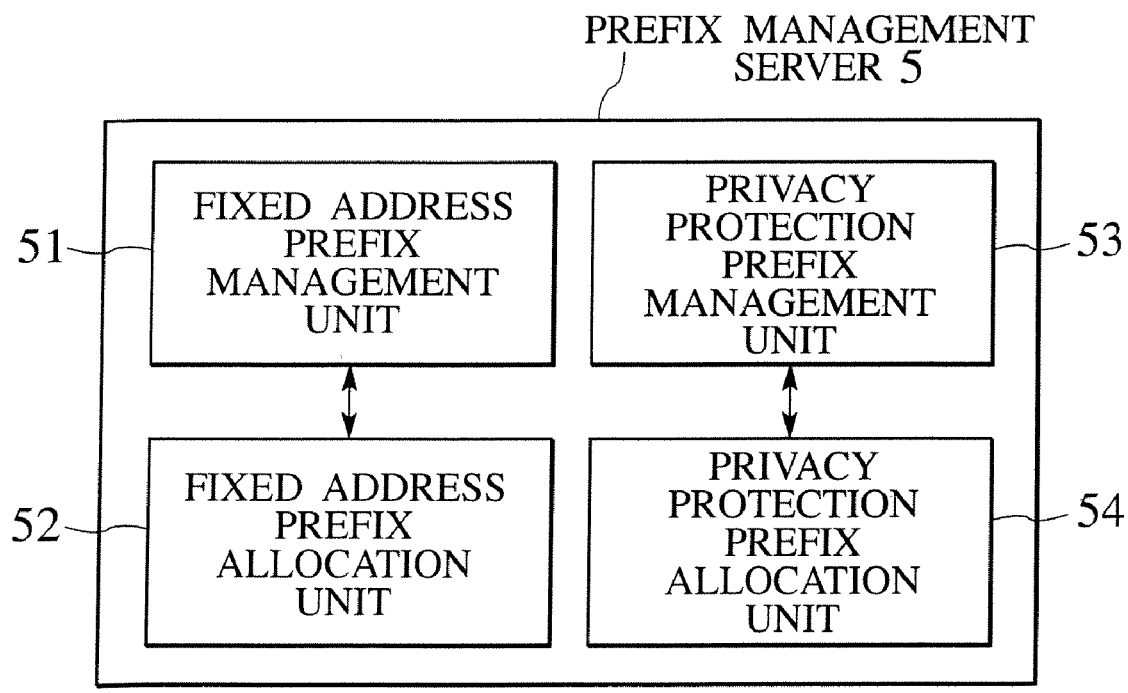
FIG. 2 is a block diagram showing an exemplary configuration of a prefix management server in the network system of FIG. 1.

FIG. 2 shows an exemplary configuration of the prefix management server 5 according to one embodiment of the present invention.

As shown in FIG. 2, the prefix management server 5 of this embodiment has a fixed address prefix management unit 51, a fixed address prefix allocation unit 52, a privacy protection prefix management unit 53 and a privacy protection prefix allocation unit 54.

The fixed address prefix management unit 51 and the fixed address prefix allocation unit 52 can be the same as the conventional ones. For example, the fixed address prefix management unit 51 manages, for each prefix in the fixed address prefix space available to that ISP, information on whether it is allocated or unused, and an allocation target router in the case it is allocated, and the fixed address prefix allocation unit 52 selects a prescribed number (one or plural) of the unused fixed address prefixes and allocate them to the allocation target router. The number of fixed address prefixes to be allocated to the allocation target router may be fixed to the same number for all routers, or may be determined as a content of the contract for each router, for example.

Note that, in this embodiment, the allocation of the fixed address prefix may be carried out either automatically or manually. Also, the method for giving the fixed address prefix from the ISP side to the router side can be any method (it can be carried out automatically via a network or a wide area radio network, or it can be such that the fixed address prefix is notified from the provider side to the user side by telephone and the user enters this into the host).

On the other hand, the privacy protection prefix management unit 53 manages, for each prefix in the fixed address prefix space available to that ISP, information on whether it is allocated or unused, an allocation target router in the case it is allocated, and a valid period. Note that, when there is no need to manage the starting time of the valid period (the case in which it is regarded as valid immediately from a timing at which it is allocated, for example), it suffices to manage only the ending time of the valid period=expiration time.

Also, the privacy protection prefix allocation unit 54 selects a prescribed number of the unused privacy protection prefixes, attaches information regarding the valid period (lifetime (assuming that it is valid from a receiving time), ending date and time (year, month, day, hour, minute, second) of the valid period (assuming that it is valid from a receiving time), or starting date and time and ending date and time of the valid period, for example), and notifies them to the allocation target router.

Note that, here, the fixed address prefix space and the privacy protection prefix space are assumed to be independent, but it is also possible to select the fixed address prefix and the privacy protection prefix from the same prefix space.

Also, instead of the above described configuration, it is possible to use a configuration in which a fixed address prefix management server for handling the fixed address prefixes and a privacy protection prefix management server for handling the privacy protection prefixes are provided separately.

In any case, it is preferable to select the privacy protection prefix to be allocated to the router such that the privacy protection prefix allocated to the router will keep changing randomly when the same router is observed along the time sequence. Also, it is preferable to select the privacy protection prefix such that there is no correlation between the fixed address prefix and the privacy protection prefix allocated to the router (so that the fixed address prefix cannot be conjectured from the privacy protection prefix). Of course, the privacy protection prefix space of the ISP should preferably be as wide as possible from a viewpoint of the above described randomness.

Figure 3:
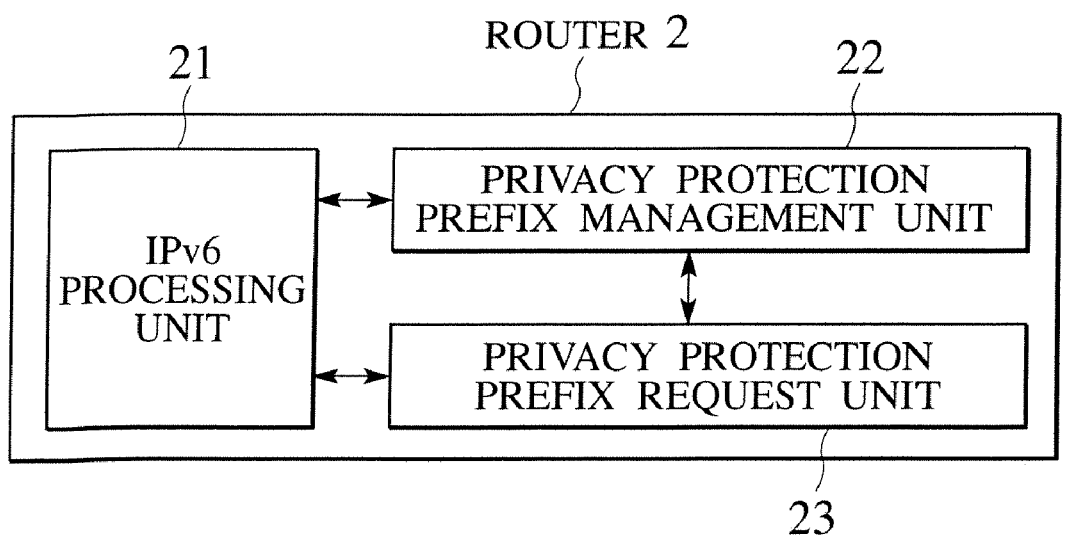
FIG. 3 is a block diagram showing an exemplary configuration of a router in the network system of FIG. 1.

FIG. 3 shows an exemplary configuration of the router 2 according to one embodiment of the present invention.

As shown in FIG. 3, the router 2 of this embodiment has an IPv6 processing unit 21, a privacy protection prefix management unit 22, and a privacy protection prefix request unit 23.

The IPv6 processing unit 21 is basically the same as the conventional one. Note that the fixed address prefixes allocated from the ISP are managed by a fixed address prefix management unit (not shown) provided inside the IPv6 processing unit 21.

The privacy protection prefix management unit 22 manages values of the privacy protection prefixes allocated from the ISP and the valid period of each privacy protection prefix (lifetime or date and time (year, month, day, hour, minute, second) obtained according to that, for example).

Note that, when there is no need to manage the starting time of the valid period (the case in which it is regarded as valid immediately from a timing at which it is allocated, for example), it suffices to manage only the ending time of the valid period=expiration time.

Figures 4A, 4B, 5, 6:
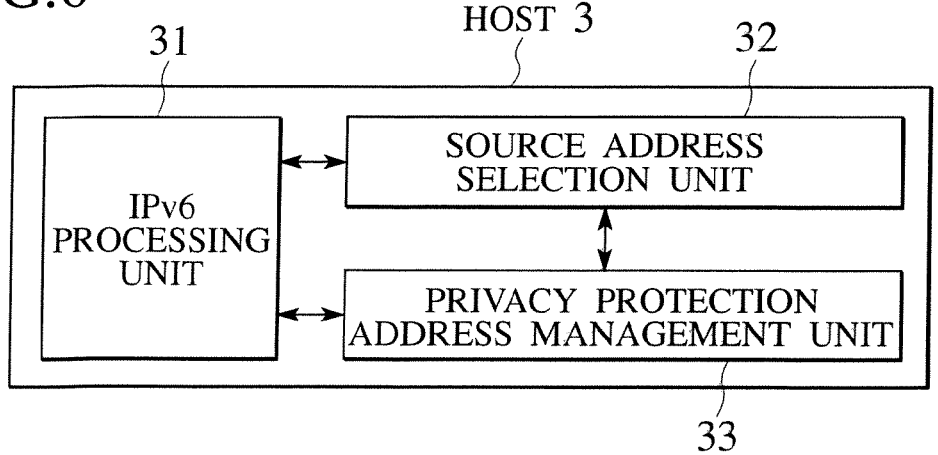
FIGS. 4A and 4B are diagrams showing one exemplary prefix management tables that can be used in the router of FIG. 3.
FIG. 5 is a diagram showing another exemplary prefix management tables that can be used in the router of FIG. 3.
FIG. 6 is a block diagram showing an exemplary configuration of a host in the network system of FIG. 1.

It is also possible to manage the fixed address prefixes and the privacy protection prefixes by separate tables as shown in FIGS. 4A and 4B. Instead of that, it is also possible to manage them by the same table by providing a flag information for indicating whether it is the fixed address prefix or the privacy protection prefix as shown in FIG. 5.

The privacy protection prefix request unit 23 requests the allocation of the privacy protection prefix to (the prefix management server 5 of) the ISP on the upstream side, at a prescribed timing such that there is no blank in the privacy protection prefixes which have the short valid periods.

For example, the privacy protection prefix request unit 23 regularly checks the management table for managing the privacy protection prefixes. Then, for example, when the remaining time until the valid period expires for the privacy protection prefix that has the valid period that expires last becomes less than a certain period of time (a prescribed fixed value, or a value obtained by multiplying a prescribed constant n less than one to the lifetime, etc., for example), the privacy protection prefix request unit 23 requests the privacy protection prefix.

Then, when the privacy protection prefix is received, the privacy protection prefix request unit 23 gives the received privacy protection prefix to the privacy protection prefix management unit 22 along with information regarding its valid period.

In this embodiment, the router 2 can advertise two types of prefix including the fixed address prefix and the privacy protection prefix within the link.

FIG. 6 shows an exemplary configuration of the host according to one embodiment of the present invention.

As shown in FIG. 6, the host 3 of this embodiment has an IPv6 processing unit 31, a source address selection unit 32 and a privacy protection address management unit 33.

In this embodiment, the host 3 can receive and obtain two types of prefix including the fixed address prefix and the privacy protection prefix as the prefixes advertised by the router within the link.

The IPv6 processing unit 31 is basically the same as the conventional one. Note that the fixed addresses generated from the fixed address prefixes advertised from the router 2 within the link are managed by a fixed address management unit (not shown) provided inside the IPv6 processing unit 31.

The privacy protection address management unit 33 manages values of the privacy protection addresses and the valid period of each privacy protection prefix (lifetime or date and time (year, month, day, hour, minute, second) obtained according to that, for example), that are generated according to the privacy protection prefixes and lifetimes advertised from the router 2 within the link.

Note that, when there is no need to manage the starting time of the valid period (the case in which it is regarded as valid immediately from a timing at which it is allocated, for example), it suffices to manage only the ending time of the valid period=expiration time.

It is also possible to manage the fixed addresses and the privacy protection addresses by separate tables as shown in FIGS. 7A and 7B. Instead of that, it is also possible to manage them by the same table by providing a flag information for indicating whether it is the fixed address or the privacy protection address as shown in FIG. 8.

The source address selection unit 32 selects which IP address is to be used as the source address of this node when the host 3 starts the communication.

Note that the host 3 may also have a function for transmitting an inquiry message for inquiring information regarding the prefix to the router 2 and receive a response message from the router 2 in response.

In the following, the processing procedures regarding the privacy protection prefix and the privacy protection address of this embodiment will be described.

First, the processing procedures regarding the privacy protection prefix for the prefix management server 5 of the ISP 4 and the router 2 of the home network 1 will be described.

Figure 9:
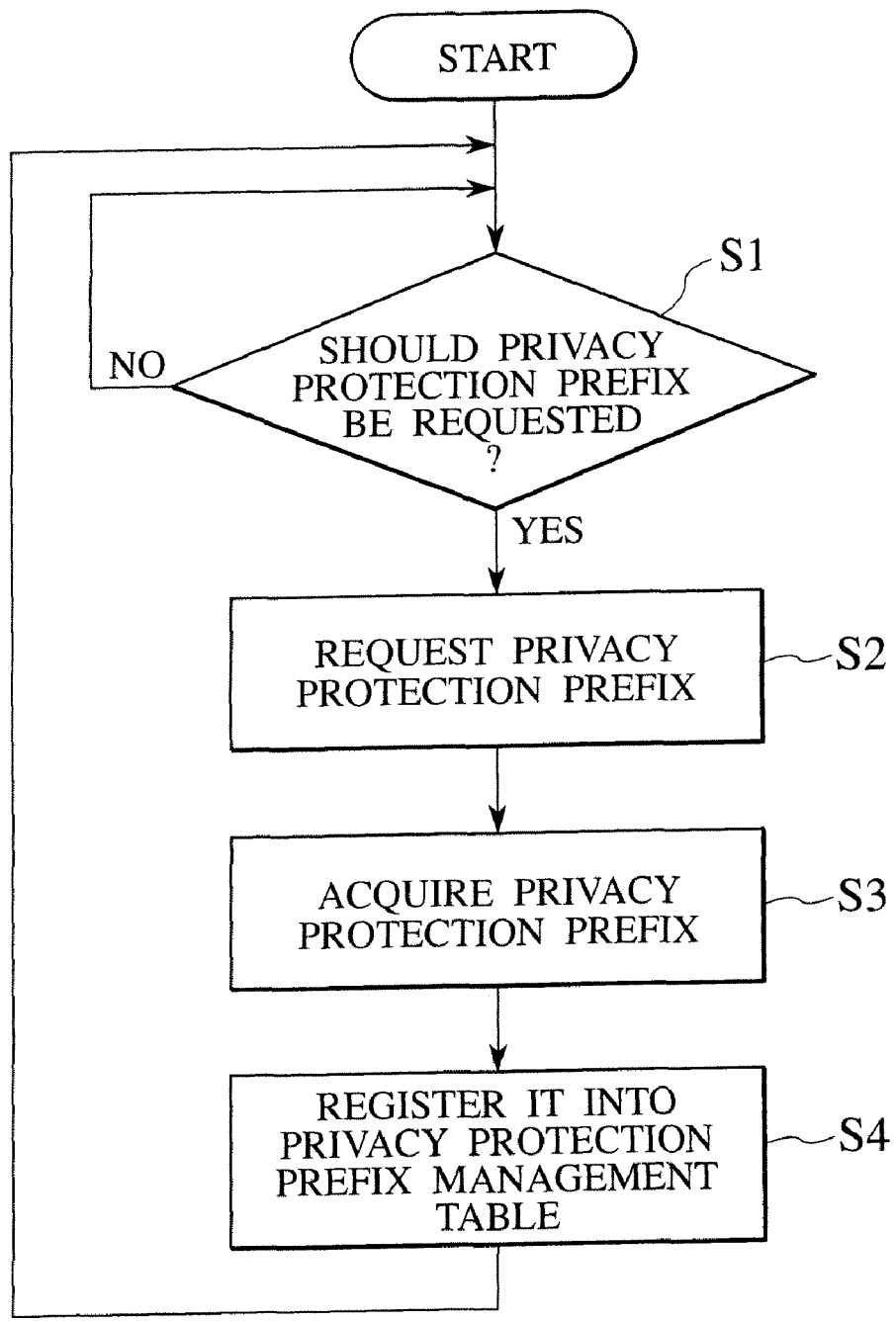
FIG. 9 is a flow chart showing an exemplary processing procedure regarding privacy protection prefixes by the router in the network of FIG. 1.
Figure 10:
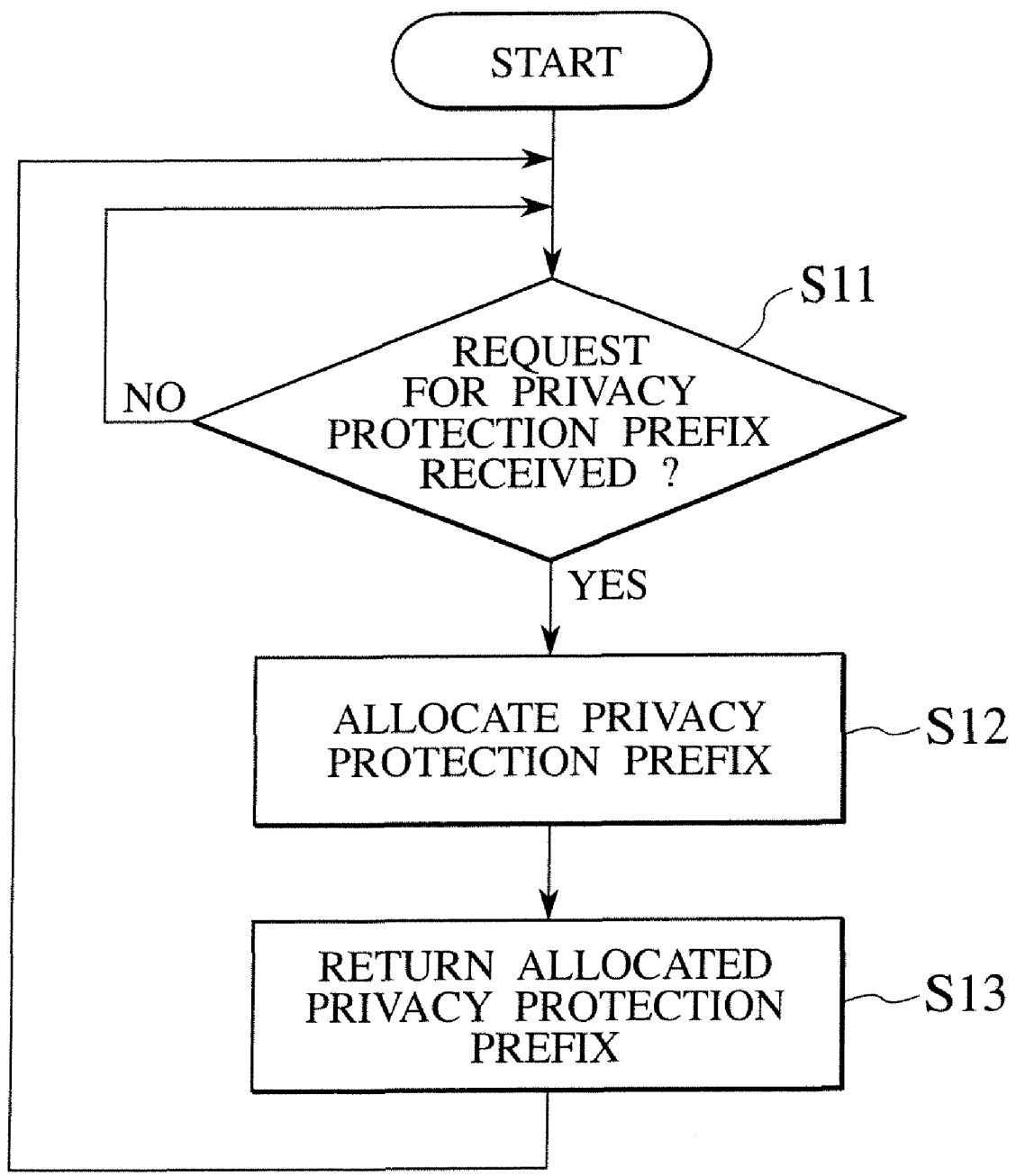
FIG. 10 is a flow chart showing an exemplary processing procedure regarding privacy protection prefixes by the prefix management server in the network of FIG. 1.

FIG. 9 shows an exemplary processing procedure regarding the privacy protection prefix for the router 2 in this embodiment. Also, FIG. 10 shows an exemplary processing procedure regarding the privacy protection prefix for the prefix management server 5 in this embodiment.

When a prescribed event for requesting the privacy protection prefix occurs (when a prescribed timing described above arrives, for example) (S1), the router 2 requests the privacy protection prefix to (the prefix management server 5 of) the ISP 4 on the upstream side (S2).

When the request for the privacy protection prefix is received from the router 2 on the downstream side (S11), the prefix management server 5 allocates a prescribed number of the privacy protection prefixes to that router 2 (S12), and returns the allocated privacy protection prefixes to that router 2 (S13).

When the privacy protection prefixes are acquired from (the prefix management server 5 of) the ISP 4 on the upstream side (S3), the router 2 registers these privacy protection prefixes into the management table (S4).

Next, the advertisement of the prefix and the generation of the IP address will be described.

In this embodiment, two types of prefix including the fixed address prefix and the privacy protection prefix are used and two types of address including the fixed address and the privacy protection address are generated, and basically the method similar to the Stateless Address Autoconfiguration (RFC 2461) defined by the IPv6 can be used for either one of these basically. Here, the exemplary case of using such a method will be described.

Namely, the router 2 periodically multicasts or broadcasts a router advertisement (RA) message containing the fixed address prefix and the privacy protection prefix within the link, as specified in RFC 2461.

As a method for advertising the fixed address prefix and the privacy protection prefix, it is possible to use a method in which a "privacy protection prefix bit" is defined as a flag in the prefix information option of the router advertisement (RA) message and it is advertised by utilizing that, or a method in which an option of a privacy prefix information is added to the router advertisement (RA) message and it is advertised by utilizing that, for example. Also, instead of advertising the fixed address prefix and the privacy protection prefix by the same message, it is possible to advertise them by separate router advertisement messages, for example.

Note that, even when the lifetime of the fixed address prefix allocated from the ISP is a long period such as three years or ten years, for example, or an indefinite period, the router 2 should preferably advertise this fixed address prefix with a lifetime shorter than the actual lifetime such as one month, for example, rather than three years or ten years (the host 3 will update the valid period of the corresponding IP address (as one month from a receiving time, for example) whenever the advertisement of the fixed address prefix is received. On the other hand, the actual lifetime (24 hours, for example) can be used for the privacy protection prefix, but it is also possible to advertise the privacy protection prefix with a lifetime shorter than that (12 hours, for example).

The host 3 that received the prefix according to the router advertisement message from the router 2 within the same link generates the IP address from that prefix and the interface ID of this node if it is a new prefix, and registers that IP address and its valid period into the management table. If it is a prefix identical to the IP address already existing in the management table, the valid period of that IP address in the management table. Note that the interface ID may be determined by a method defined in RFC 3401.

Also, the host 3 is monitoring the valid period of each IP address in the management table regularly, and discards the IP address for which the valid period has expired (deletes it from the management table).

Next, the processing regarding the IP address selection by the host 3 will be described.

In this embodiment, the host 3 can have two types of IP address including the fixed address that remains unchanged for a long time and the privacy protection address that changes in a short time. Consequently, the host 3 can selectively use (one or plural) fixed addresses and (one or plural) privacy protection addresses according to the need. There are various methods or policies for selectively using these IP addresses.

Figure 11:
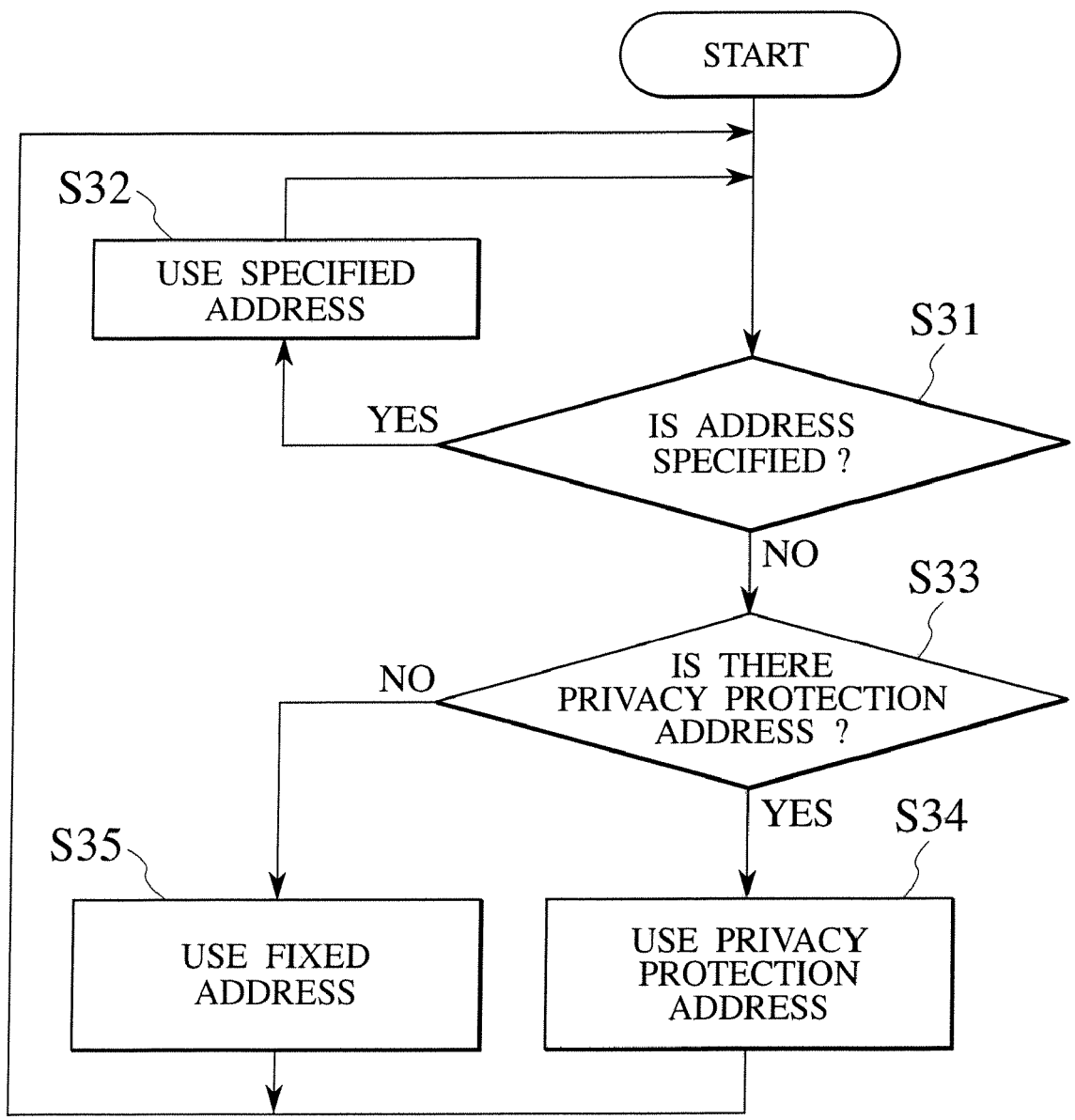
FIG. 11 is a flow chart showing an exemplary processing procedure regarding IP address selection by the host in the network of FIG. 1.

FIG. 11 shows an exemplary processing procedure regarding the IP address selection by (the source address selection unit 32 of) the host 3 in this embodiment.

When the host 3 starts the communication, if the IP address to be used is explicitly commanded from an entity (a process such as application, for example) requesting the Internet access (that is the IP packet transmission/reception) (S31), this commanded IP address is used (S32).

If the IP address is not commanded (S31), the management table (see FIG. 7B and FIG. 8) of the privacy protection address management unit 33 is referred to check presence/absence of the currently available privacy protection address, and if the available privacy protection address exists (S33), this privacy protection address is used (S34).

Note that, if a plurality of available privacy protection addresses exist, one of them is selected according to a prescribed selection method and used. The prescribed selection method can be a method for selecting it randomly, a method for selecting it sequentially each time (in an ascending order of values, for example). a method for selecting it for a prescribed number of times and repeating that sequentially (in an ascending order of values, for example), a method for selecting it according to a type of the application (by assigning a plurality of privacy protection addresses to a plurality of application types in advance), a method for selecting it according a type of the communication data (by assigning a plurality of privacy protection addresses to a plurality of communication data types in advance), a method for selecting one with the longest remaining time until the valid period expires (when more than one of them have the longest remaining time, it is selected randomly among them or according to some other criteria), a method combining any of the above methods suitably, etc., for example.

On the other hand, if there is no available privacy protection address (S33), the fixed address is used (S35). Note that if a plurality of available fixed addresses exist, one of them is selected according to a prescribed selection method (which can be the same as the selection method described above, for example) and used.

In the following, an exemplary processing procedure of this embodiment will be described by using a concrete example.

Figure 12:
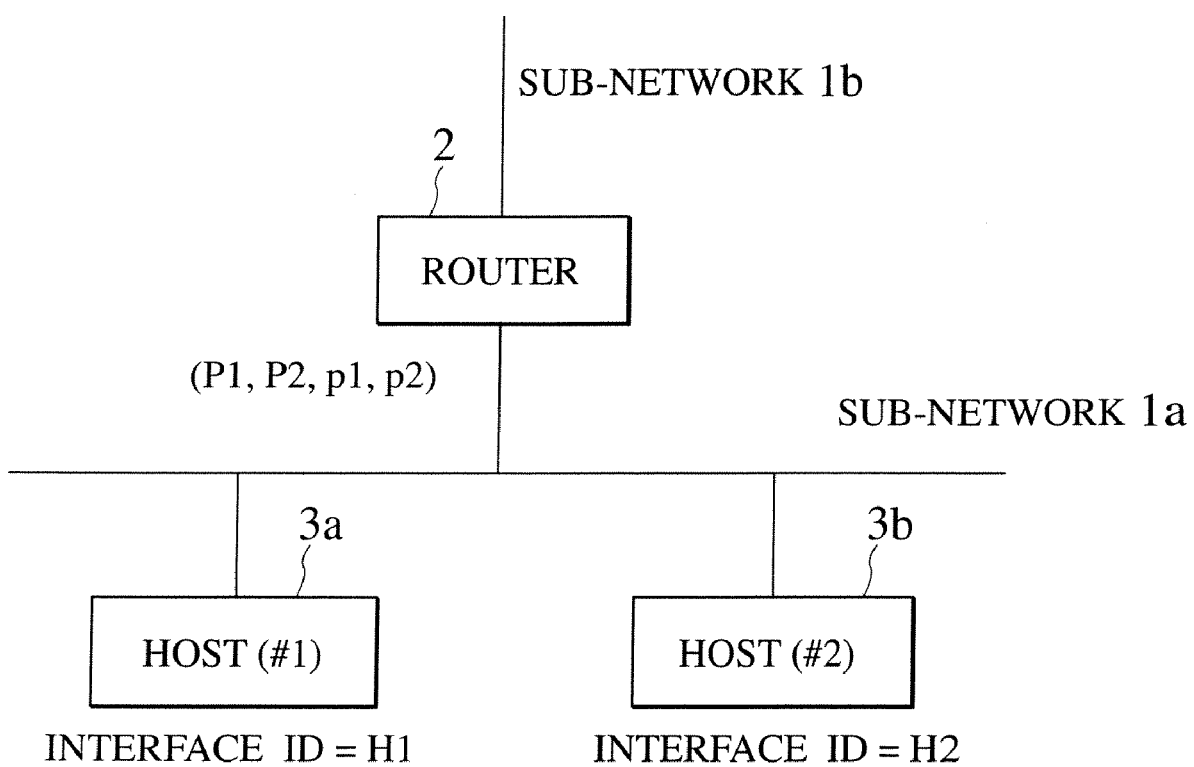
FIG. 12 is a diagram showing an exemplary configuration of a home network in the network system of FIG. 1.

FIG. 12 shows an exemplary home network. On a sub-network 1a side of the router 2 for accessing the ISP on the upstream side, a first host 3a and a second host 3b are connected. It is assumed that the first host 3a has the interface ID of "H1" and the second host 3b has the interface ID of "H2".

The router 2 first has the fixed address prefixes allocated by the ISP. It is assumed that the allocated fixed address prefixes are "P1" and "P2". As mentioned above, the fixed address prefixes "P1" and "P2" have long valid periods so that they can be regarded as fixed. These prefixes are described in the DNS or the like.

On the other hand, the router 2 has the privacy protection prefixes to be returned in short time (having short valid periods) allocated, in addition to the fixed address prefixes (they are automatically allocated by the ISP in response to a request from the router on the downstream side, as mentioned above).

Here, suppose that the router 2 has the privacy protection prefix "p1" allocated at a time "t0", with the valid period of "lt1". Here it is assumed that the router 2 had no privacy protection address before the time "t0" for the sake of simplicity.

The router 2 multicasts or broadcasts the router advertisement (RA) message containing the fixed address prefixes "P1" and "P2" and the privacy protection prefix "p1" to the sub-network 1a side.

The host 3 that received the router advertisement (RA) message generates the own IP address by using the interface ID of that node. In this example, at the first host 3a, the fixed addresses "P1:H1" and "P2:H1" are generated while the privacy protection address "p1:H1" is generated and they are allocated to the interface. Similarly, at the second host 3b, the fixed addresses "P1:H2" and "P2:H2" are generated while the privacy protection address "p1:H2" is generated and they are allocated to the interface.

Now, in the case where a blank in the valid privacy protection prefix occurs when the valid period "lt1" elapses, the router 2 requests the allocation of the privacy protection prefix before the valid period "lt1" elapses.

Here, it is assumed that the router 2 has the privacy protection prefix "p2" allocated at a time "t1" (t1<lt1), with the valid period of "lt2".

The router 2 multicasts or broadcasts the router advertisement (RA) message containing the fixed address prefixes "P1" and "P2" and the privacy protection prefix "p2" to the sub-network 1a side.

In this example, at the first host 3a, the valid periods of the fixed addresses "P1:H1" and "P2:H1" are updated while the privacy protection address "p2:H1" is newly generated and allocated to the interface. Similarly, at the second host 3b, the valid periods of the fixed addresses "P1:H2" and "P2:H2" are updated while the privacy protection address "p2:H2" is newly generated and allocated to the interface.

In other words, during a period between t1 and lt1, both "p1:H1" and "p2:H1" become available as the privacy protection address at the first host 3a, and both "p1:H2" and "p2:H2" become available as the privacy protection address at the second host 3b, temporarily.

Also, after lt1 has elapsed, only "p2:H1" is available as the privacy protection address at the first host 3a, and only "p2:H2" is available as the privacy protection address at the second host 3b.

Consequently, at the first host 3a, as the privacy protection address, "p1:H1" is used before t1, "p1:H1" and/or "p2:H1" are used between t1 and lt1 (depending on the address selection method), and "p2:H1" is used after lt1 (until a new privacy protection address becomes available). Here, it is impossible to judge whether the host that uses "p1:H1" and the host that uses "p2:H1" are the same or not from the external, so that it is only possible to eavesdrop packets, take statistics regarding IP addresses and analyze them, for each one of "p1:H1" and "p2:H1" separately. However, the privacy protection address is steadily changed in short time, so that it is impossible to acquire the effective privacy information by the eavesdropping, statistics and analysis.

According to this embodiment, even when each home network is constantly connected to the Internet by using IPv6, it is possible to use fixedly used IP addresses and IP addresses with shorter valid periods, so that the IP address that is steadily changed in short time can be used in cases other than those in which the fixedly used IP address must be used, so that the possibility of having the communications tracked according to the identity of the IP address can be eliminated, and the privacy protection (in device units or home network units) becomes possible.

Thus, according to the present invention, it becomes possible to prevent the privacy violation that utilizes the IP address.

Now, in the above described embodiment, the allocation of the privacy protection prefix is requested from the router to the ISP, the privacy protection prefix is allocated to that router by that ISP in response, the privacy protection prefix and the lifetime are transmitted from that ISP to that router, the privacy protection prefix and the lifetime are advertised within the link by that router, and the privacy protection address according to the received privacy protection prefix and lifetime is used by the host in the link.

Instead of that, it is also possible to use a method in which the allocation of the privacy protection prefix is requested from the router to the ISP, a plurality of privacy protection prefixes for different valid periods are collectively allocated to that router by that ISP in response, the plurality of privacy protection prefixes for different valid periods and the lifetimes are collectively transmitted from that ISP to that router, the privacy protection prefix and the lifetime are advertised within the link by that router according to each valid period, and the privacy protection address according to the received privacy protection prefix and lifetime is used by the host in the link.

It is also possible to use a method in which the allocation of the privacy protection prefix is requested from the router to the ISP, a plurality of privacy protection prefixes for different valid periods are collectively allocated to that router by that ISP in response, the plurality of privacy protection prefixes for different valid periods and the lifetimes are collectively transmitted from that ISP to that router, the plurality of privacy protection prefix and the lifetimes are collectively advertised within the link by that router, and the use of the privacy protection address according to the received privacy protection prefix and lifetime is scheduled by the host in the link according to each valid period.

There are also various modifications that can possibly be made in this embodiment.

For example, in the case where a plurality of privacy protection prefixes are allocated from the ISP at some timing, the router may advertise all of them within the link, or advertise only a selected part of them within the link.

Similarly, in the case where a plurality of privacy protection prefixes are advertised from the router within the same link at some timing, the host may generate respective privacy protection addresses according to all of them, or generate respective privacy protection addresses according to only a selected part of them.

Also, up to this point, the case of using the lifetime as the information regarding the valid period that is attached to the prefix to be advertised within the link by the router, but it is also possible to make various modifications such as the use of the ending date and time (year, month, day, hour, minute, second) of the valid period, the use of the starting date and time and the ending date and time of the valid period, etc.

Also, up to this point, the privacy protection prefix is allocated from the ISP to the router when the privacy protection prefix is requested from the router to the ISP, but it is also possible to use a configuration in which the ISP autonomously allocates the privacy protection prefix to the router and this privacy protection prefix is transmitted from the ISP to the router.

Also, in the above, the case of implementing the function regarding the privacy protection prefix in the router for connecting the ISP and the home network has been described, but it is also possible to use a configuration in which the function regarding the privacy protection prefix is implemented in a router or the like other than the router for connecting the ISP and the home network.

Also, in the above, the exemplary case where a single sub-network is formed inside the home network has been described, but the present invention is equally applicable to the case where a plurality of routers form a hierarchical structure inside the home network.

Also, in the above, the exemplary case where the ISP and the home network are connected by a wired network has been described, but the present invention is equally applicable to the case where the ISP and the home network are connected by a radio network.

Also, in the above, the exemplary case where the home network is formed by a wired LAN has been described, but the present invention is equally applicable to the case where a whole or a part of the home network is formed by a radio LAN.

Also, in the above, the exemplary case of using the home network as a local area network has been described, but the present invention is equally applicable to the case of using the other local network such as an enterprise network.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the router and the host of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A router for connecting one or a plurality of hosts and Internet through an accessing communication path of a provider, the router comprising:
 a first connection port configured to be connected to the Internet via the accessing communication path;
 a second connection port configured to be connected to the one or the plurality of hosts;
 a management unit configured to manage one or a plurality of first type prefixes and their valid periods, and one or a plurality of second type prefixes that have shorter valid periods than the first type prefixes and their valid periods, which are allocated from the provider;

a request unit configured to request allocation of one or a plurality of new second type prefixes to the provider, before all of the second type prefixes managed by the management unit become invalid;

an advertisement unit configured to advertise periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts; and the advertisement unit is further configured to multicast or broadcast a first router advertisement message containing the first type prefixes and the information regarding the valid periods of the first type prefixes that is to be informed to the hosts, periodically within a link managed by the router, and also multicast or broadcast a second router advertisement message containing the second type prefixes and the information regarding the valid periods of the second type prefixes that is to be informed to the hosts, periodically within a link managed by the router.

2. The router of claim 1, wherein the advertisement unit advertises the information regarding the valid periods given in terms of lifetimes.

3. A prefix management method at a router for connecting one or a plurality of hosts and Internet through an accessing communication path of a provider, the prefix management method comprising:

connecting the router to the Internet via the accessing communication path;

connecting the router to the one or the plurality of hosts;

managing one or a plurality of first type prefixes and their valid periods, and one or a plurality of second type prefixes that have shorter valid periods than the first type prefixes and their valid periods, which are allocated from the provider;

requesting allocation of one or a plurality of new second type prefixes to the provider, before all of the second type prefixes managed by the managing become invalid;

advertising periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts;

multicasting or broadcasting a first router advertisement message containing the first type prefixes and the information regarding the valid periods of the first type prefixes that is to be informed to the hosts, periodically within a link managed by the router; and multicasting or broadcasting a second router advertisement message containing the second type prefixes and the information regarding the valid periods of the second type prefixes that is to be informed to the hosts, periodically within a link managed by the router.

4. A computer readable medium storing computer instructions which when executed by a computer cause the computer to function as a router for connecting one or a plurality of hosts and Internet through an accessing communication path of a provider to perform steps comprising:

connecting the router to the Internet via the accessing communication path;

connecting the router to the one or the plurality of hosts;

managing one or a plurality of first type prefixes and their valid periods, and one or a plurality of second type prefixes that have shorter valid periods than the first type prefixes and their valid periods, which are allocated from the provider;

requesting allocation of one or a plurality of new second type prefixes to the provider, before all of the second type prefixes managed by the managing become invalid;

advertising periodically the first type prefixes that are still within their valid periods and information regarding the valid periods of the first type prefixes that is to be informed to the hosts, and the second type prefixes that are still within their valid periods and information regarding the valid periods of the second type prefixes that is to be informed to the hosts;

multicasting or broadcasting a first router advertisement message containing the first type prefixes and the information regarding the valid periods of the first type prefixes that is to be informed to the hosts, periodically within a link managed by the router; and multicasting or broadcasting a second router advertisement message containing the second type prefixes and the information regarding the valid periods of the second type prefixes that is to be informed to the hosts, periodically within a link managed by the router.

* * * * *